United States Patent [19]

Yawata et al.

[11] Patent Number: 5,448,748
[45] Date of Patent: Sep. 5, 1995

[54] COMPUTER WITH ALARM SOUNDING APPARATUS HAVING SELECTABLE OUTPUT

[75] Inventors: Masashi Yawata, Gunma; Yasukazu Imaizumi, Ashikaga, both of Japan

[73] Assignee: Sanyo Electric Co., Ltd., Japan

[21] Appl. No.: 290,108

[22] Filed: Aug. 15, 1994

Related U.S. Application Data

[63] Continuation of Ser. No. 931,338, Aug. 18, 1992, abandoned.

[30] Foreign Application Priority Data

Aug. 30, 1991 [JP] Japan ................ 3-219840

[51] Int. Cl.⁶ ............................................. G06F 11/30
[52] U.S. Cl. ................................. 364/500; 395/180; 395/186
[58] Field of Search ............. 395/800, 725, 750; 340/509, 521, 636

[56] References Cited

U.S. PATENT DOCUMENTS

| | | | |
|---|---|---|---|
| 3,906,491 | 9/1975 | Gosswiller et al. | 340/509 |
| 4,015,237 | 3/1977 | Takatani et al. | 340/549 |
| 4,660,027 | 4/1987 | Davis | 340/636 |
| 4,667,289 | 5/1987 | Yoshida | 395/275 |
| 4,686,514 | 8/1987 | Liptak, Jr. et al. | 340/571 |
| 4,984,185 | 1/1991 | Saito | 364/707 |
| 5,057,779 | 10/1991 | Mittel | 324/431 |
| 5,076,260 | 12/1991 | Komatsu | 601/59 |
| 5,136,246 | 8/1992 | Sakamoto | 324/433 |
| 5,163,151 | 11/1992 | Bronikowski et al. | 395/725 |
| 5,230,055 | 7/1993 | Katz et al. | 395/750 |

FOREIGN PATENT DOCUMENTS

| | | |
|---|---|---|
| 0171459 | 2/1986 | European Pat. Off. . |
| 0416589 | 3/1991 | European Pat. Off. . |
| 57-106920 | 7/1982 | Japan . |
| 58-214862 | 12/1983 | Japan . |
| 3-28914 | 2/1991 | Japan . |
| 2205427 | 12/1988 | United Kingdom . |

OTHER PUBLICATIONS

"Battery-Monitoring Device for Computer Systems", *IBM Technical Disclosure Bulletin*, vol. 34, No. 1, Jun. 1991, pp. 190-192.

Primary Examiner—Robert B. Harrell
Assistant Examiner—Viet Vu
Attorney, Agent, or Firm—Oliff & Berridge

[57] ABSTRACT

When a drop of the voltage of a battery is detected, a detector outputs two kinds of alarm signals in accordance with the degree of voltage drop. Two PALs for generating an alarm signal input the respective alarm signals to a selector. An alarm signal from another PAL which generates an alarm signal in accordance with the state of a panel switch and a sound signal from a speaker data generator which generates various sound signals in accordance with a signal from a CPU are also supplied to the selector. The selector selects one from these signals so as to drive a speaker. Since a means for generating an alarm signal is provided separately from the speaker data generator, an alarm sounding operation is ensured.

15 Claims, 11 Drawing Sheets

COMPUTER WITH ALARM SOUNDING APPARATUS HAVING SELECTABLE OUTPUT

This is a Continuation of application Ser. No. 07/931,338 filed Aug. 18, 1992, now abandoned.

BACKGROUND OF THE INVENTION

1. Field of the Invention

The present invention relates to an alarm sounding apparatus for a computer such as a notebook type or a lap-top personal computer or word processor.

2. Description of the Related Art

Battery-driven computers such as notebook type or lap-top personal computers have a function of sounding an alarm to warn the user that the battery capacity becomes very small or that the display panel is closed while the power source is ON.

As shown in FIG. 11, a voltage detector 2 is connected to a nickel cadmium battery 1 as the power source. The voltage detector 2 turns a signal BATT0 to "H" when the voltage of the nickel cadmium battery 1 drops below a first threshold value, while turning a signal BATT1 to "H" when the voltage of the nickel cadmium battery 1 drops below a second threshold value.

An NMI (Non Maskable Interrupt) generator 3 is connected to the voltage detector 2, and the signals BATT0 and BATT1 are supplied to the NMI generator 3 which generates an NMI signal as the highest priority interrupt signal. A panel switch 4 is connected to the NMI generator 3. To the NMI generator 3 is supplied a signal PANELSW which is turned to "H" when the LCD panel, which also serves as a lid of the main frame, is closed during use.

The NMI generator 3 generates an NMI signal when one of the three signals input thereto is "H", and supplies the NMI signal to a CPU 5. A RAM 6 is connected to the CPU 5. The CPU 5 constantly reads out and executes the program stored in the RAM 6 at ordinary time. On the other hand, when the NMI signal, which is the highest priority interrupt signal, is input to the CPU 5, the CPU 5 executes the processing for sounding an alarm in accordance with the NMI signal. In other words, the CPU 5 calls the NMI routine which is stored at the address specified by the NMI vector address of the RAM 6, and executes the NMI routine so as to generate data for sounding an alarm.

A speaker data generator 7 is connected to the CPU 5. The speaker data generator 7 generates a sounding signal SPKOUT in accordance with various commands for producing a sound, and supplies the sounding signal SPKOUT to a speaker 8. The speaker 8 sounds an alarm in accordance with the sounding signal SPKOUT when the data for sounding an alarm is received from the CPU 5. An alarm is sounded when the battery capacity is reduced to a first threshold value, or to a second threshold value or when the display panel is closed during use. Three different alarms are generally sounded in correspondence with these three states.

In this way, an alarm is sounded when the CPU 5 executes the NMI routine which is stored in the RAM 6.

The NMI routine is written at a predetermined address of the RAM 6 when the power source is turned on. However, some application programs executed by a computer greatly change the contents of RAM 6, so that a different program is sometimes written at the same address that the NMI routine is written. In such cases, when the NMI signal is generated by the NMI generator 3, the CPU 5 executes not the NMI routine but the application program stored at the address which is specified by the NMI vector address. Since not the NMI routine but an unexpected program is executed, there is a possibility of the runaway of the computer.

SUMMARY OF THE INVENTION

Accordingly, it is an object of the present invention to eliminate the above-described problems in the related art and to provide an alarm sounding apparatus for a computer which ensures an alarm sounding operation.

To achieve this aim, the present invention provides an alarm sounding apparatus applicable to a computer provided with a speaker data generator which outputs a sounding signal for driving a speaker so as to produce a sound on the basis of the data supplied from a CPU. The alarm sounding apparatus according to the present invention comprises: an alarm sounding condition detecting means for outputting a detection signal which commands an alarm to be sounded when a predetermined condition is satisfied; an alarm signal outputting means for outputting an alarm signal for driving the speaker in accordance with the detection signal output from the alarm sounding condition detecting means; and a selecting means for receiving signals from the speaker data generator and the alarm signal outputting means and selecting and outputting either of the signals.

When the predetermined condition is satisfied, the alarm sounding condition detecting means outputs a detection signal which commands an alarm to be sounded. In accordance with this signal, the alarm signal outputting means outputs an alarm signal for driving the speaker. On the other hand, when the computer drives the speaker for executing various programs, the speaker data generator outputs a signal for driving the speaker. In the present invention, the selecting means receives at least two speaker driving signals and selects and outputs one signal to the speaker, and the speaker produces a sound in accordance with the input signal.

In this way, since the means for outputting an alarm signal is provided separately from a means for outputting a sounding signal in accordance with a command from the CPU, it is possible to sound an alarm even if the RAM is reloaded. That is, an alarm sounding operation is ensured. When the selecting means is accommodated in the alarm signal outputting means, it is also possible to drive the speaker under a predetermined condition.

There are a plurality of conditions of alarm sounding, and the alarm sounding condition detecting means outputs different detection signals in correspondence with the respective conditions. The alarm signal outputting means outputs different alarm signals in correspondence with the plural kinds of detection signals input thereto. It is therefore possible to detect plural kinds of conditions and to sound alarms which correspond to the respective kinds of detection signals.

The alarm signal outputting means is composed of a plurality of logic circuits, and the plurality of detection signals output from the alarm sounding condition detecting means are supplied to the respective logic circuits. In this way, effective alarm sounding is enabled.

The alarm sounding condition detecting means detects the voltage of the battery. When the voltage drops below a first threshold value, the alarm sounding condition detecting means outputs a first detection signal, and when the voltage drops below a second threshold value, the alarm sounding condition detecting means outputs a second detection signal. The alarm sounding condition detecting means also detects the ON/OFF state of the panel switch, which shows the open/closed state of the panel, and outputs a third detection signal showing this ON/OFF state.

The alarm signal which is output from the alarm signal outputting means has a predetermined silent period both at the start and at the end of sounding an alarm. This silent period enables discrimination between the alarm and sound due to another signal.

The selecting means may be accommodated in the alarm signal outputting means, thereby greatly simplifying the circuit structure.

The above and other objects, features and advantages of the present invention will become clear from the following description of the preferred embodiments thereof, taken in conjunction with the accompanying drawings.

DESCRIPTION OF THE PREFERRED EMBODIMENTS

Preferred embodiments of the present invention will be explained hereinunder with reference to the accompanying drawings.

First Embodiment

Figure 1:
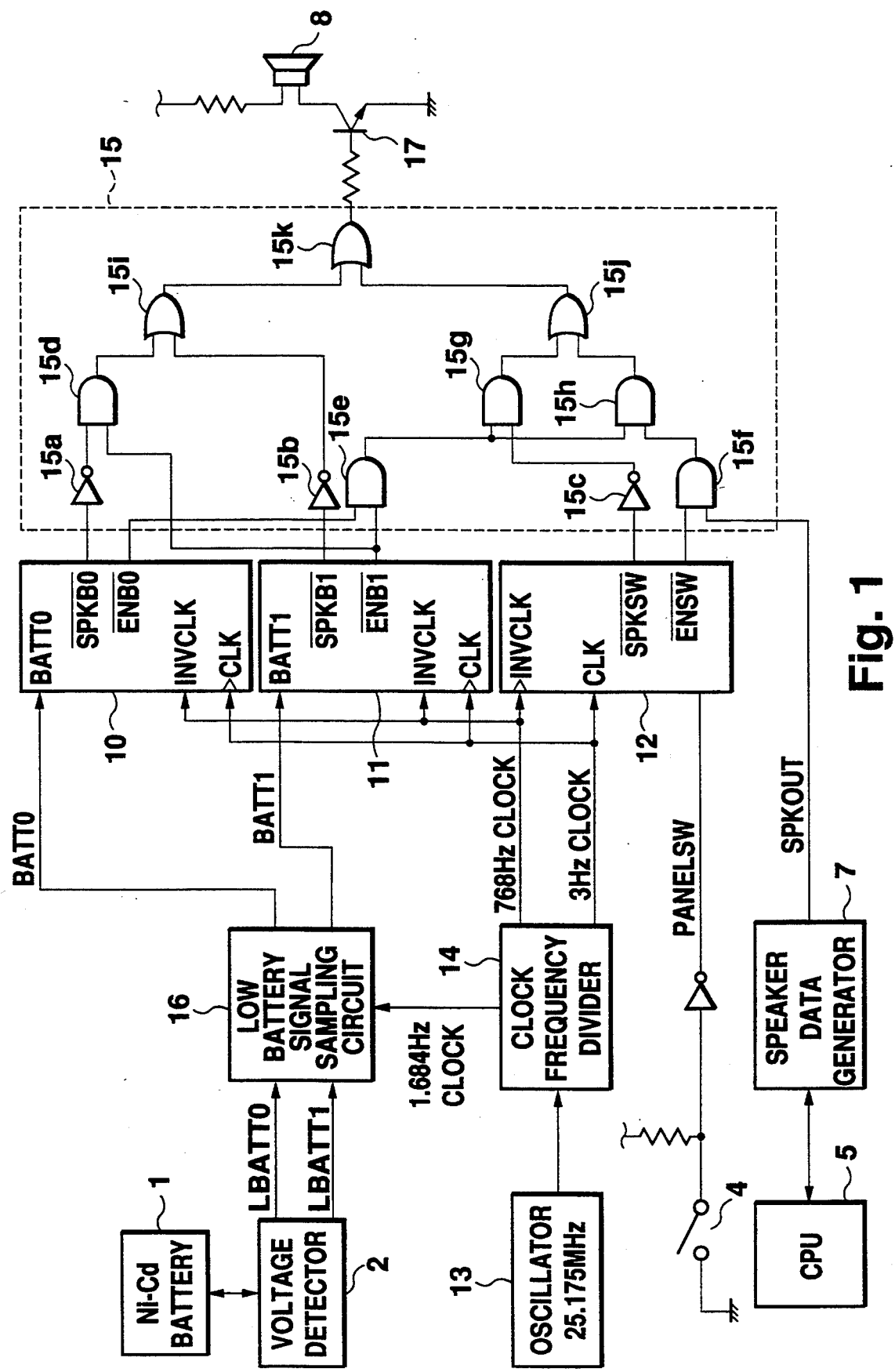
FIG. 1 is a block diagram of the structure of a first embodiment of an alarm sounding apparatus according to the present invention.

FIG. 1 is a block diagram of the entire structure of a first embodiment of an alarm sounding apparatus according to the present invention. In the same way as in a conventional apparatus, this embodiment is provided with a nickel cadmium battery 1, a voltage detector 2, a panel switch 4, a CPU 5, a speaker data generator 7 and a speaker 8. Unlike the conventional apparatus, this embodiment is provided with three alarm signal generating PALs (Programmable Array Logics), namely, an alarm signal generating PAL 10 to which a signal BATT0 is input, an alarm signal generating PAL 11 to which a signal BATT1 is input thereto and an alarm signal generating PAL 12 to which a signal PANELSW is input. A clock of 768 Hz, which determines the frequency of an alarm, is supplied to the INVCLK input terminal of each of the PALs 10, 11 and 12, and a clock of 3 HZ, which determines the timing for shifting the state, is supplied to the CLK input terminal thereof. The PALs 10, 11 and 12 output inverted signals $\overline{SPKB0}$, $\overline{SPKB1}$ and $\overline{SPKSW}$, respectively, as the alarm signals, and outputs inverted signals $\overline{ENB0}$, $\overline{ENB1}$ and $\overline{ENSW}$, respectively, as the signals representing the respective operational states. These clocks are obtained by dividing the frequency of the clock supplied from an oscillator 13 of 25,175 MHz by a clock frequency divider 14. The data supplied from the voltage detector 2 is supplied to the PALs 10, 11 not directly but through a low battery signal sampling circuit 16.

This embodiment is also provided with a selector circuit 15 for selecting one from the alarm signals which are output from the three PALs 10, 11 and 12 and the sounding signal which is output from the speaker data generator 7. The selector circuit 15 is composed of three inverters 15a, 15b and 15c, five AND gates 15d, 15e, 15f, 15g and 15h, and three OR gates 15i, 15j and 15k. A transistor 17 is turned ON/OFF in accordance with the signal output from the selector circuit 15 so as to drive the speaker 8. The panel switch 4 is a switch provided at the hinge portion of the LCD panel so as to be mechanically turned ON/OFF.

The clock frequency divider 14 also generates a clock of 1.684 Hz and supplies it to the low battery signal sampling circuit 16. The low battery signal sampling circuit 16 samples the input signals LBATT0 and LBATT1 in accordance with the rise of the supplied clock, and supplies sampled signals to the PALs 10 and 11, respectively, as the signals BATT0 and BATT1. Accordingly, when the voltage of the nickel cadmium battery 1 drops below a first threshold value, the voltage detector 2 turns the signal LBATT0 to "H", and the low battery signal sampling circuit 16 samples this state and turns the signal BATT0 to "H". When the voltage of the nickel cadmium battery 1 drops below a second threshold value, the voltage detector 2 turns the signal LBATT1 to "H", and the low battery signal sampling circuit 16 samples this signal and turns the signal BATT1 to "H". In this embodiment, the rated voltage of the nickel cadmium battery 1 is 12 V, and the first threshold value is set at 10.8 V and the second threshold value at 10.4 V.

Figure 2:
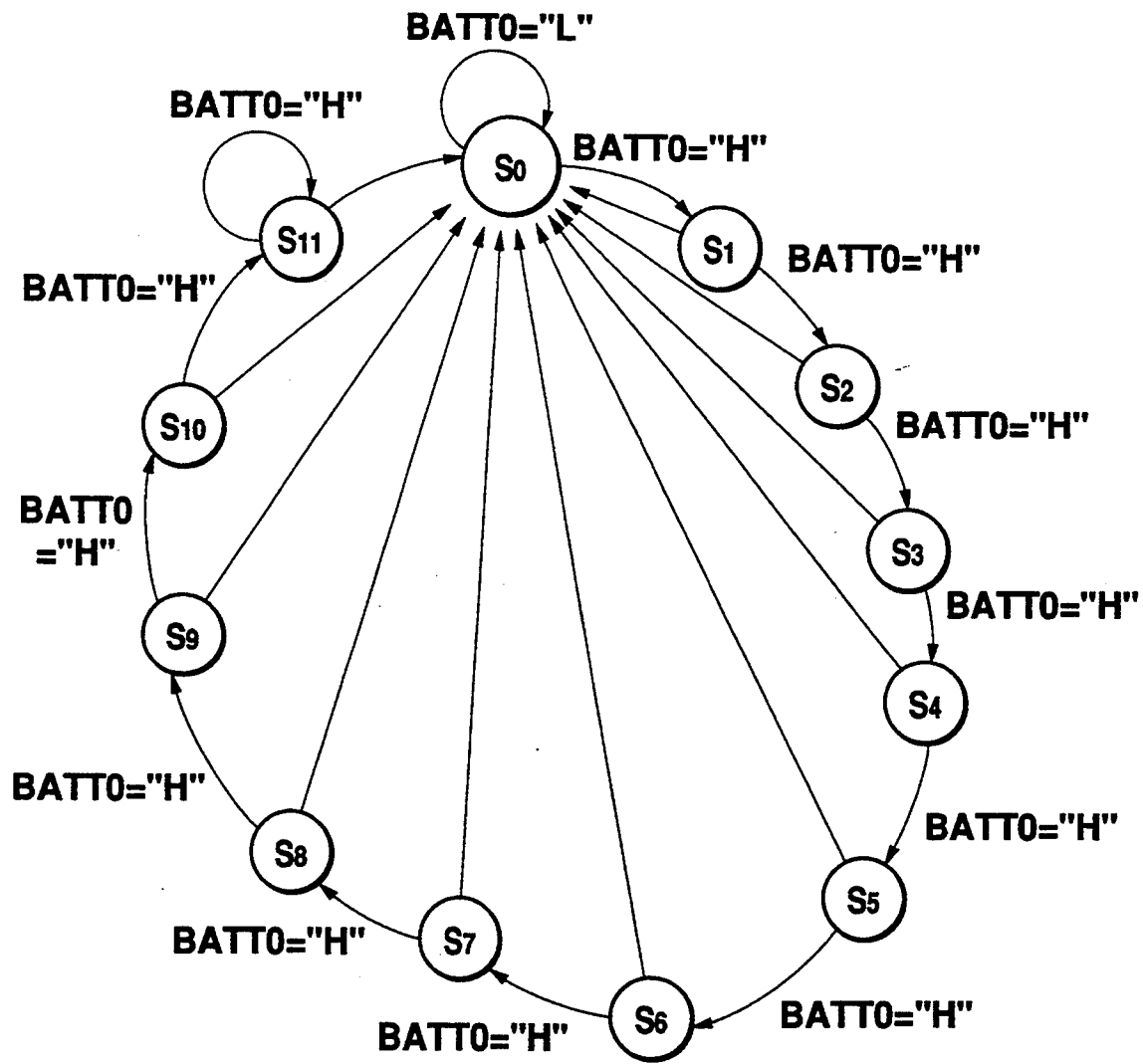
FIG. 2 is a sequence control diagram of a PAL 10.

FIG. 2 is a sequence control diagram of the PAL 10. As is obvious from FIG. 2, the PAL 10 has states S0 to S11. When the signal BATT0 is "H", the state S0 of the PAL 10 subsequently shifts to the states S1, S2, ... S11. When the signal BATT0 is "L", each state is returned to the state S0. If the signal BATT0 is "L" in the state S0, the state S0 is repeated, while if the signal BATT0 remains "H" in the state S11, the state S11 is repeated.

Figure 3:
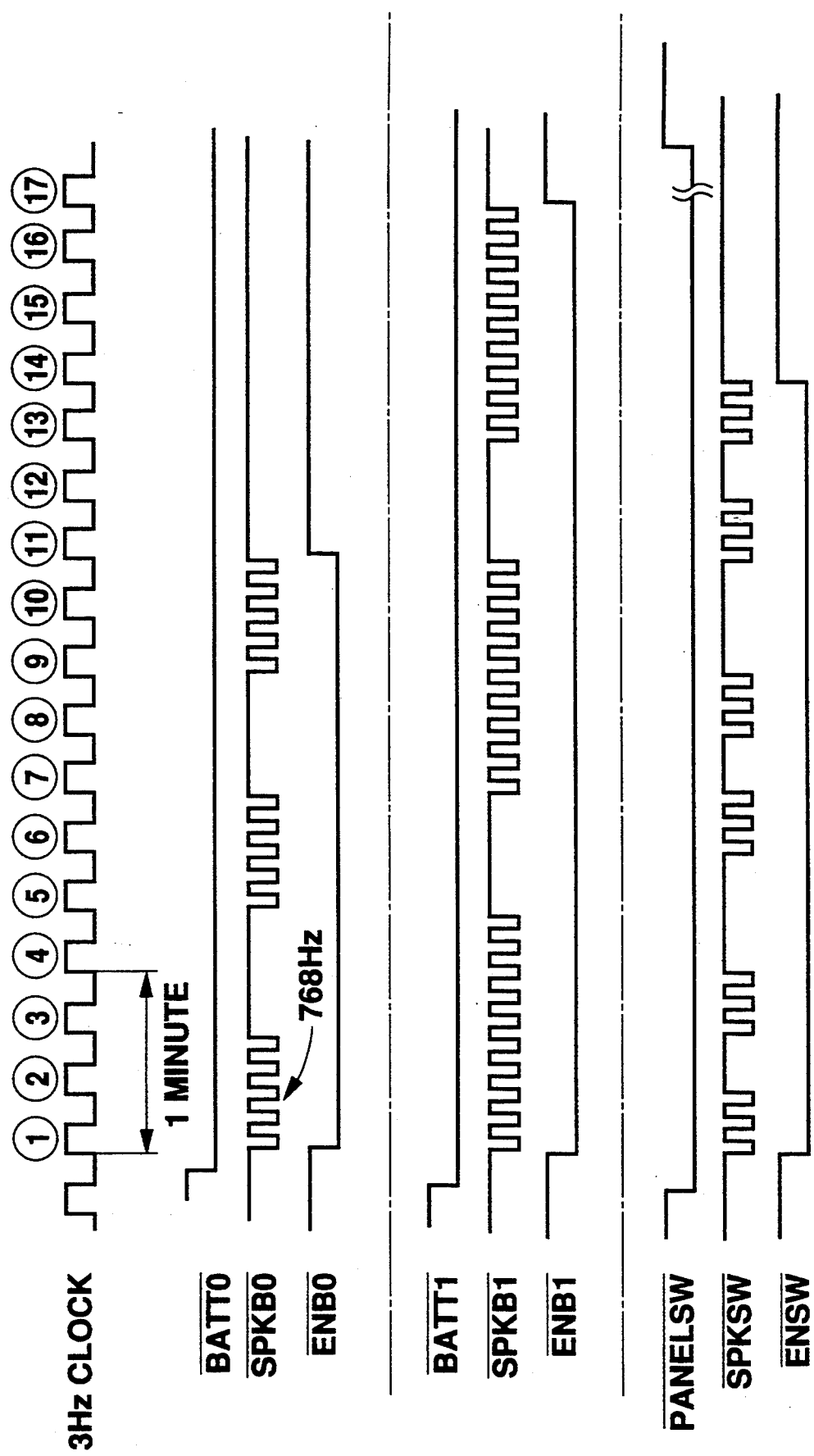
FIG. 3 is a timing chart of the operation of the first embodiment.

When the PAL 10 assumes the state S1, S2, S5, S6, S9 or S10, the PAL 10 outputs a clock of 768 Hz (alarm signal) as the inverted signal $\overline{SPKB0}$. Therefore, when the inverted signal $\overline{BATT0}$ is turned to "L", the state subsequently shifts at the rise of a clock of 3 HZ, as shown in FIG. 3. An alarm signal is output in two states (⅔ sec), and the output of the alarm signal is prohibited in the next two states (⅔ sec). After the alarm signal is output three times, the PAL 10 remains in the state S11.

Figure 4:
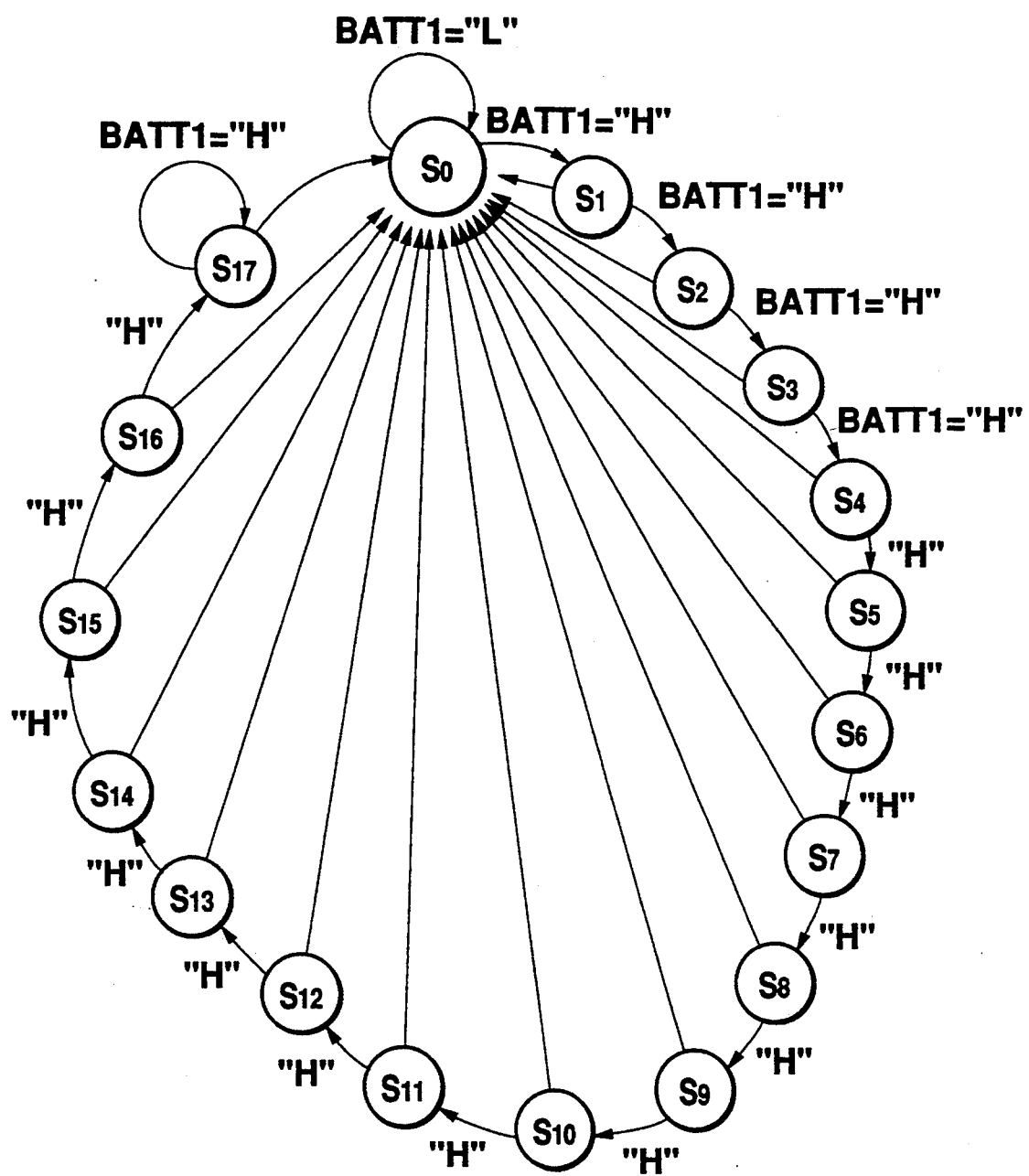
FIG. 4 is a sequence control diagram of a PAL 11.

As shown in FIG. 4, the alarm signal generating PAL 11 to which the BATT1 is input has the states S0 to S17. When the signal BATT1 is "L", the state is returned to S0 in the same way as in the case of BATT0. When the PAL 11 assumes one of the states S1 to S4, S7 to S10, and S13 to S16, the PAL 11 outputs an alarm signal as the inverted signal $\overline{SPKB1}$. Accordingly, an alarm signal is output in four states, and the output of the alarm signal is prohibited in the next two states. Thus, the alarm signal is output three times.

Figure 5:
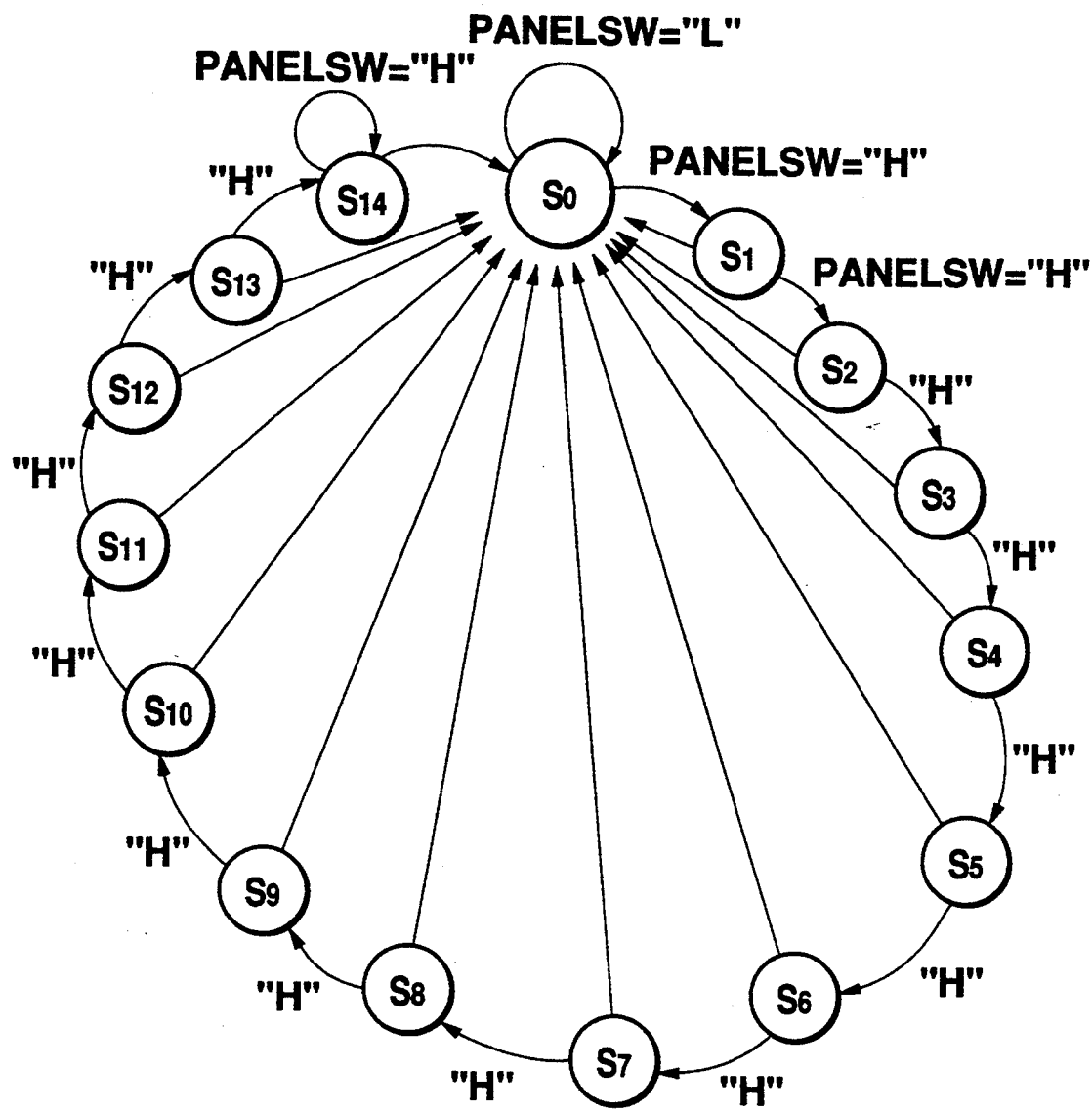
FIG. 5 is a sequence control diagram of a PAL 12.

FIG. 5 is a sequence control diagram of the PAL 12. When the PAL 12 assumes one of the states S1, S3, S6, S8, S11 and S13, the PAL 12 outputs an alarm signal as the inverted signal $\overline{SPKSW}$. Accordingly, an alarm signal is output in one state, the output of the alarm signal is prohibited in the next one state, the alarm signal is output in the next one state, the output of the alarm signal is prohibited in the next two states, the alarm signal is output in the next one state, the output of the alarm signal is prohibited in the next one state, the alarm signal is output in the next one state, the output of the alarm signal is prohibited in the next two states, the alarm signal is output in the next one state, the output of the alarm signal is prohibited in the next one state and the alarm signal is output in the next one state, as shown in FIG. 3.

When signals are simultaneously output from the PALs 10, 11, 12 and the speaker data generator 7, the selector circuit 15 selects one of the signals and supplies the selected signal to the speaker 8. More specifically, while the PALs 10, 11 and 12 are outputting alarm signals, they output the inverted signals $\overline{ENB0}$, $\overline{ENB1}$ and $\overline{ENSW}$, respectively. The inverted signal $\overline{ENB1}$ from the PAL 11 is supplied to the AND gate 15d. The inverted signal $\overline{SPKB0}$ which is further inverted by an inverter 15a is also supplied to the AND gate 15d. Therefore, while the PAL 11 is operated, the inverted signal $\overline{ENB1}$ is "L", thereby prohibiting the inverted signal $\overline{SPKB0}$ from being output from the PAL 10. On the other hand, the inverted signal $\overline{SPKB1}$ from the PAL 11 is supplied to the base of the transistor 17 through the inverter 15b, the OR gate 15i and the OR gate 15k. Consequently, the output of the PAL 11 drives the speaker 8 at the highest priority.

The inverted signal $\overline{ENB0}$ from the PAL 10 and the inverted signal $\overline{ENB1}$ from the PAL 11 are supplied to the AND gate 15e. Accordingly, a signal "H" is output from the AND gate 15e only when both PALs 10 and 11 are in the inoperative state. The output of the AND gate 15e is supplied to the AND gate 15g. The inverted signal $\overline{SPKSW}$ from the PAL 12 is also supplied to the AND gate 15g through the inverter 15c. Consequently, an alarm signal is output from the PAL 12 only when both PALs 10 and 11 are in the inoperative state. That is, the priority of the output of the PAL 12 comes third. The output of the AND gate 15g is supplied to the base of the transistor 17 through the OR gate 15j and the OR gate 15k. The inverted signal $\overline{ENSW}$ from the PAL 12 is supplied to the AND gate 15f. The output SPKOUT of the speaker data generator 7 is also supplied to the AND gate 15f. The output of the AND gate 15f is supplied to the AND gate 15h together with the output of the AND gate 15e. Consequently, the signal SPKOUT from the speaker data generator 7 is output from the AND gate 15h only when all the PALs 10, 11 and 12 are in the inoperative state and all the inverted signals $\overline{ENB0}$, $\overline{ENB1}$ and $\overline{ENSW}$ are "H". The output from the AND gate 15h is supplied to the base of the transistor 17 though the OR gates 15j and 15k.

In this manner, the selector circuit 15 selects one from the four signals for driving the speaker 8. The priority is in the order of the output of the PAL 11, the output of the PAL 10, the output of the PAL 12 and the output of the speaker data generator 7.

As described above, according to this embodiment, an alarm is sounded by supplying a signal generated by an oscillator 13, which is provided exclusively for this purpose, to the base of the transistor 17 through the clock frequency divider 14, the PALs 10, 11 and 12 and the selector circuit 15. It is therefore possible to sound an alarm independently of the operation of the CPU 5. As a result, even if the RAM is reloaded by an application program, an alarm sounding operation is ensured. Especially, since the speaker 8 is driven in accordance with the signal selected by the selector circuit 15 from the signals including a sound signal from the CPU 5, an alarm sounding operation is further ensured.

Second Embodiment

Figure 6:
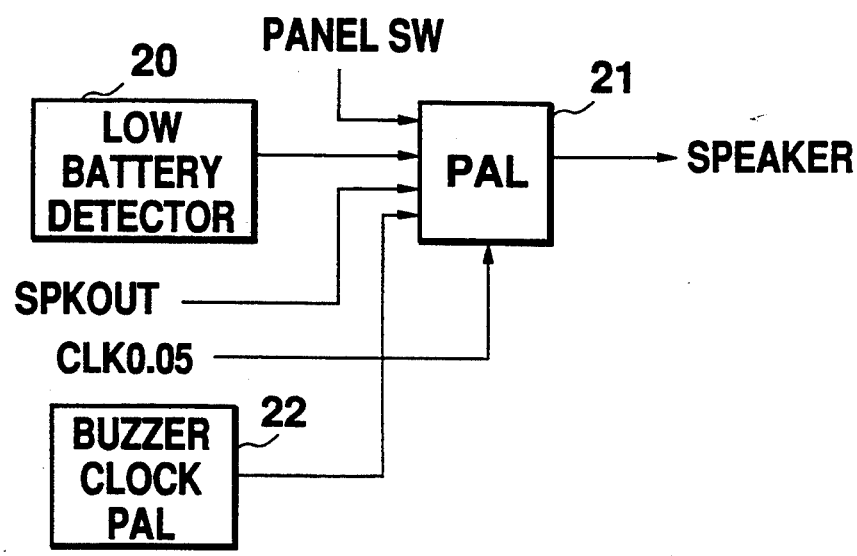
FIG. 6 is a block diagram of the structure of a second embodiment of an alarm sounding apparatus according to the present invention.

FIG. 6 shows the structure of a second embodiment of an alarm sounding apparatus according to the present invention. A low battery detector 20 has both the function of the voltage detector 14 and the function of the low battery signal sampling circuit 16 in the first embodiment. In other words, the low battery detector 20 detects the voltage of the nickel cadmium battery 1 and outputs the signals BATT0 and BATT1. In this embodiment, a single PAL 21 serves as the PALs 10, 11 and 12 in the first embodiment. To the PAL 21 are supplied the signals BATT0 and BATT1 from the low battery detector 20, the signal PANELSW from the panel switch, the signal SPKOUT from the speaker data generator, and an alarm signal having a frequency of, for example, 768 Hz and a clock signal CLK0.05 of, for example, 20 Hz, which determines the timing for shifting the state, from a buzzer clock PAL 22. The function of the PAL 21 is approximately a combination of the functions of the PALs 10, 11 and 12, and the selector circuit 15 in the first embodiment. The PAL 21 is characterized by the fact that a silent period is provided before and after an alarm sounding period. The frequency of an alarm signal is determined by the buzzer clock PAL 22.

The phase number is determined according to whether each of the input signals PANELSW, BATT1 and BATT0 is "H" (1) or "L" (0), and what is output from the speaker is determined in accordance with the phase number, as follows.

| PANELSW | BATT1 | BATT0 | Phase No. |
|---------|-------|-------|-----------|
| 0 | 0 | 0 | 0 (BATT1 alarm) |
| 0 | 0 | 1 | 1 (Abnormal) |
| 0 | 1 | 0 | 2 (BATT0 alarm) |
| 0 | 1 | 1 | 3 (Normal) |
| 1 | 0 | 0 | 4 (BATT1 alarm) |
| 1 | 0 | 1 | 5 (LCD alarm) |
| 1 | 1 | 0 | 6 (BATT0 alarm) |
| 1 | 1 | 1 | 7 (LCD alarm) |

Figure 7:
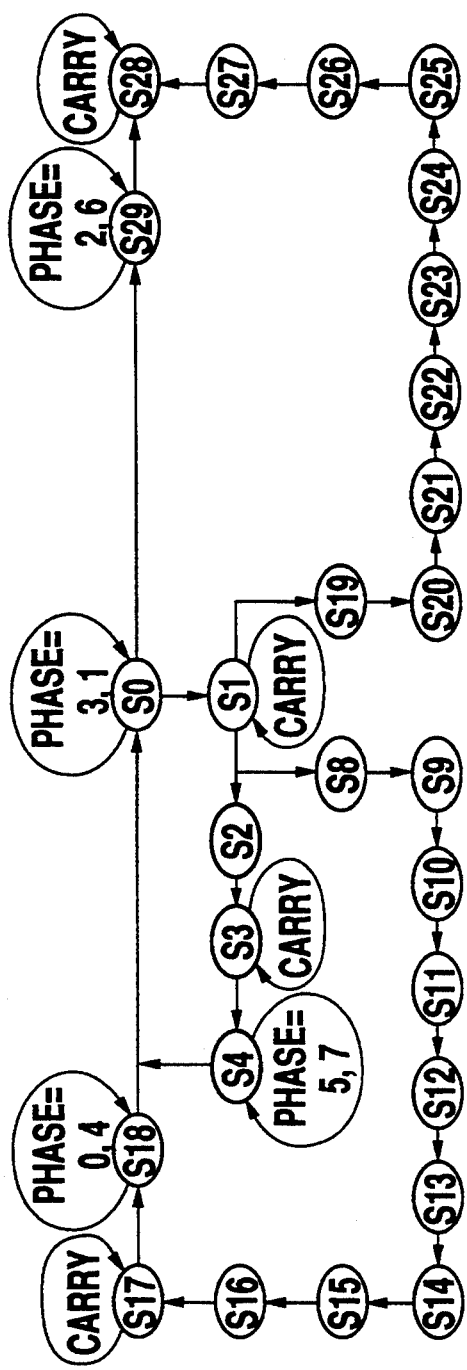
FIG. 7 is a sequence control diagram of a PAL 22.

In the case of the phase 1 or 3, since the state is abnormal or normal and there is no need to sound an alarm, the command for loop is executed in the state S0, and the state S0 is not shifted to another state. Therefore, the signal SPKOUT is output as it is, as shown in FIG. 7.

In the case of the phase 5 or 7, the state is shifted in the order of S0, S1, S2, S3, S4 and S0, and an alarm is sounded to warn the user that the LCD panel is closed during use. In the case of the phase 0 or 4, the state is shifted in the order of S0, S1, S8, S9, S10, . . . S17 and S18, and an alarm is sounded to warn the user that the signal BATT1 is H. In the case of the phase 2 or 6, the state is shifted in the order of S0, S1, S19, S20, S21, . . . S27, S28 and S29, and an alarm is sounded to warn the user that the signal BATT0 is H.

In each state, the following operation is conducted.

S0: The signal SPKOUT supplied from the system is output as it is.

S1: The signal CO_ST is turned to "H", and the command for loop is executed until the Carry turns to "H" (timer used before sounding an alarm).

S2: An alarm signal having a frequency (e.g., 768 Hz) determined by the buzzer clock is output.

S3: The signal CO_ST is turned to "H", and the command for loop is executed until the Carry turns to "H" (timer used after sounding an alarm).

S4: The command for loop is executed until the state is shifted to a state other than the states in the phase 5 or 7 (the signal SPKOUT supplied from the system is output as it is).

S8: An alarm signal having a frequency determined by the buzzer clock is output.

S9: Dummy state.

S10: An alarm signal having a frequency determined by the buzzer clock is output.

S11 to S13: Dummy state.

S14: An alarm signal having a frequency determined by the buzzer clock is output.

S15: Dummy state.

S16: An alarm signal having a frequency determined by the buzzer clock is output.

S17: The signal CO_ST is turned to "H", and the command for loop is executed until the Carry turns to "H" (timer used after sounding an alarm).

S18: The command for loop is executed until the state is shifted to a state other than the states in the phase 0 or 4 (the signal SPKOUT supplied from the system is output as it is).

S19 to S21: An alarm signal having a frequency determined by the buzzer clock is output.

S22 to S24: Dummy state.

S25 to S27: An alarm signal having a frequency determined by the buzzer clock is output.

S28: The signal CO_ST is turned to "H", and the command for loop is executed until the Carry turns to "H" (timer used after sounding an alarm).

S29: The command for loop is executed until the state is shifted to a state other than the states in the phase 2 or 6 (the signal SPKOUT supplied from the system is output as it is).

Figure 8:
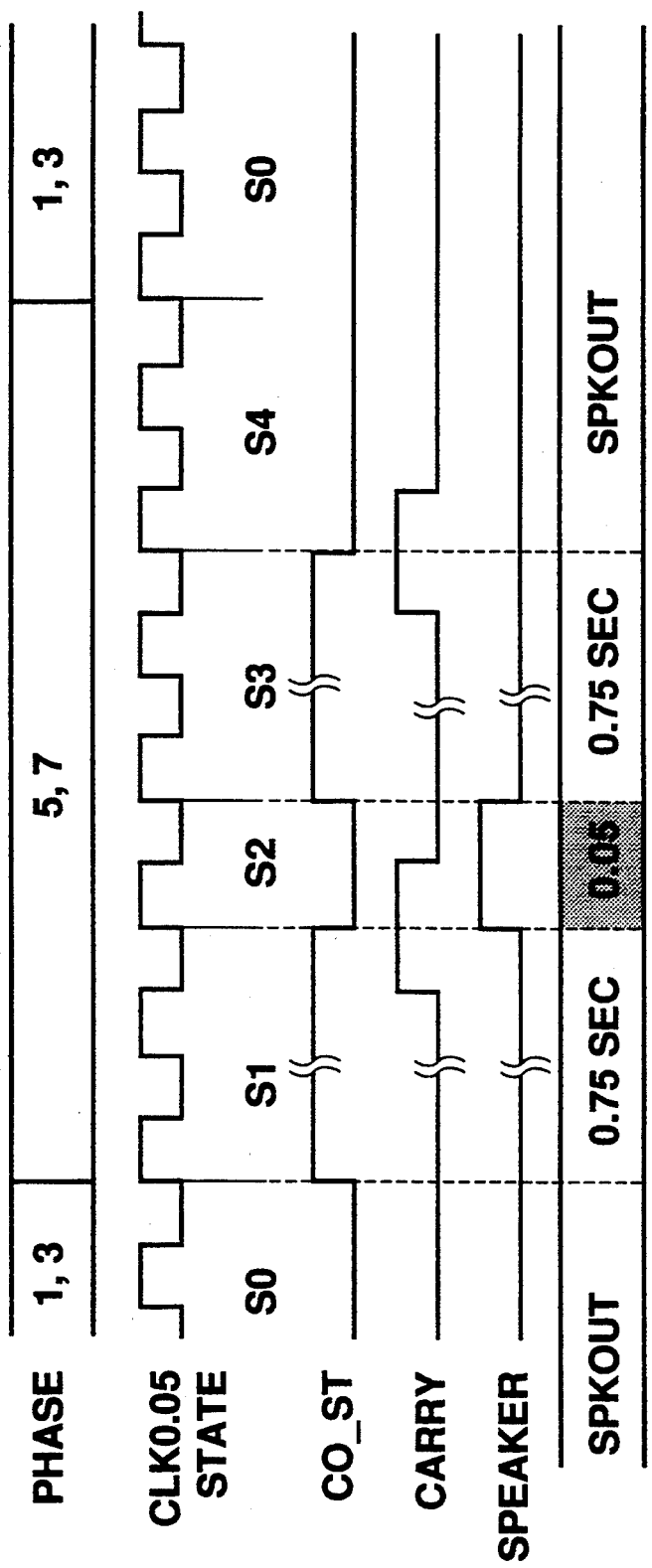
FIG. 8 is a timing chart for sounding an alarm when the LCD panel is closed.
Figure 9:
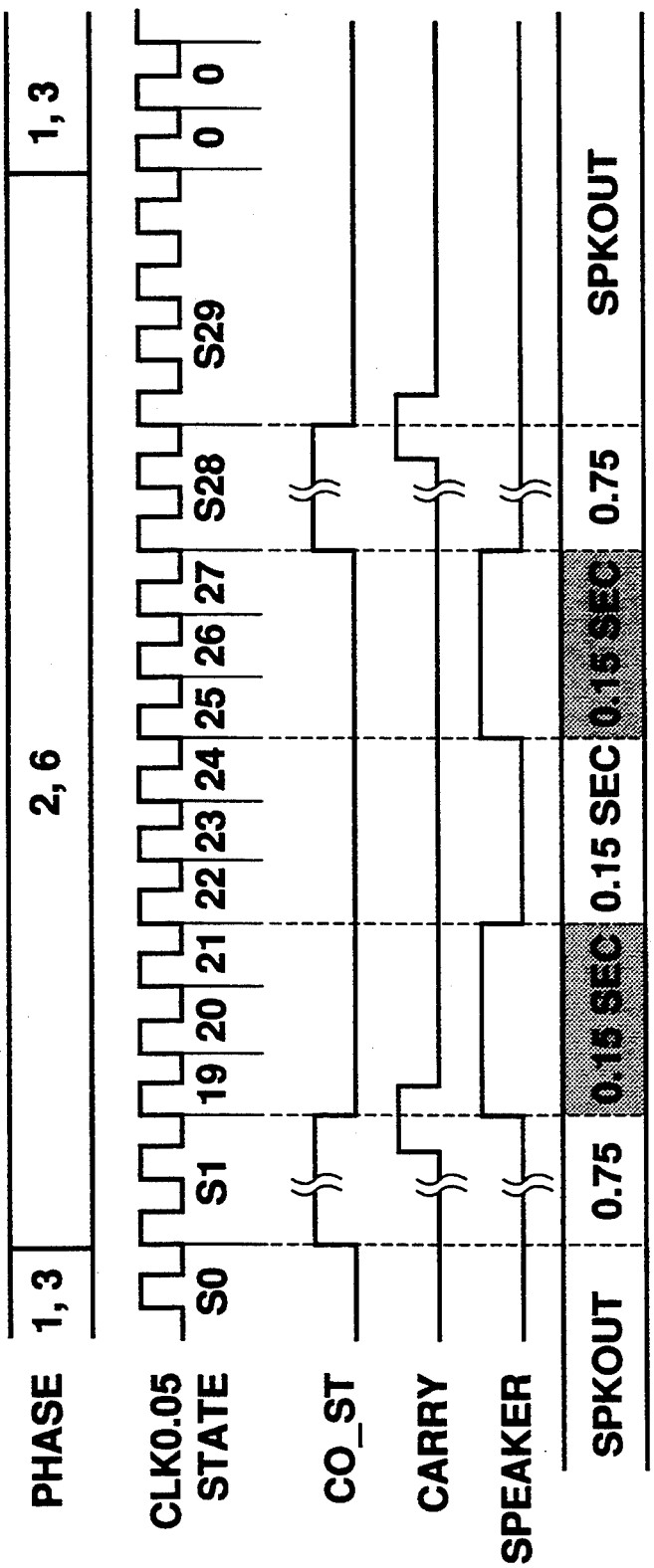
FIG. 9 is a timing chart for sounding an alarm BATT0.
Figure 10:
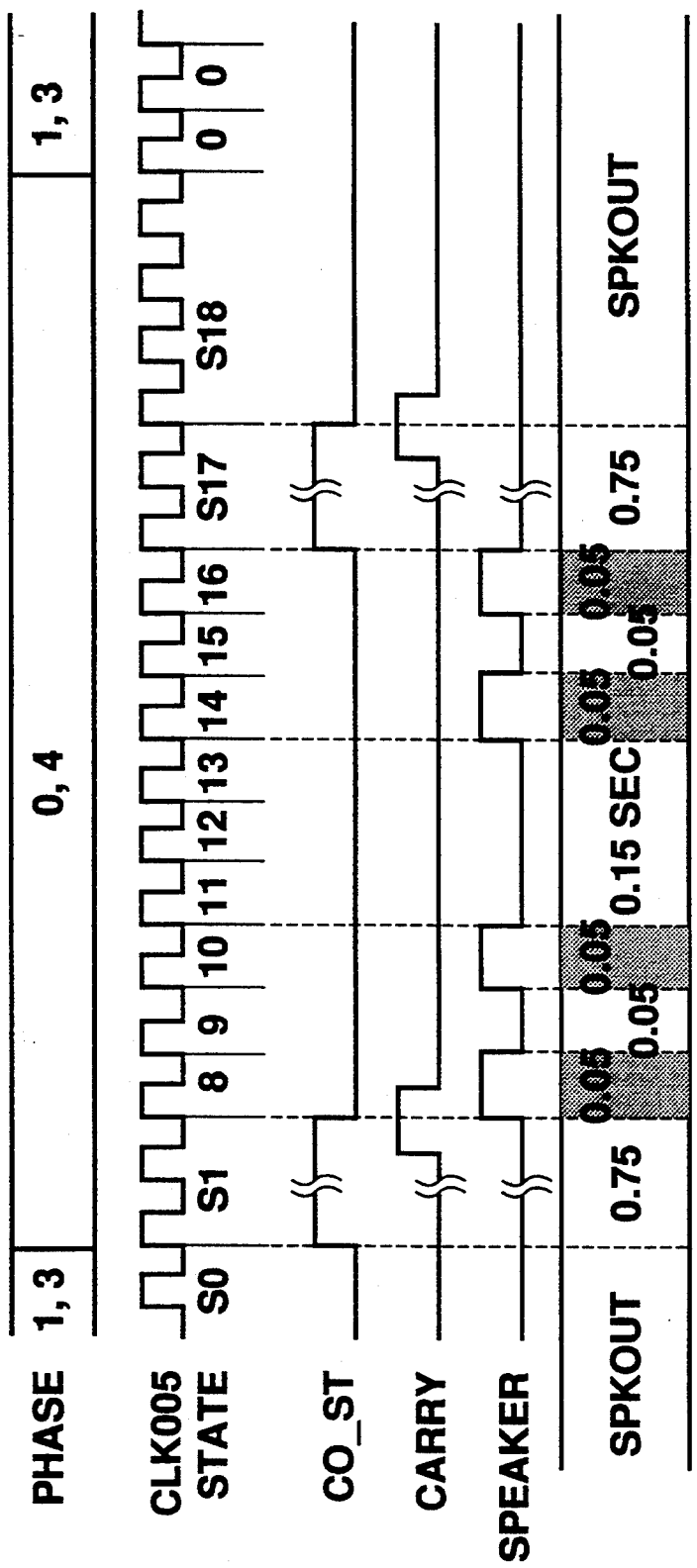
FIG. 10 is a timing chart for sounding an alarm BATT1.
Figure 11:
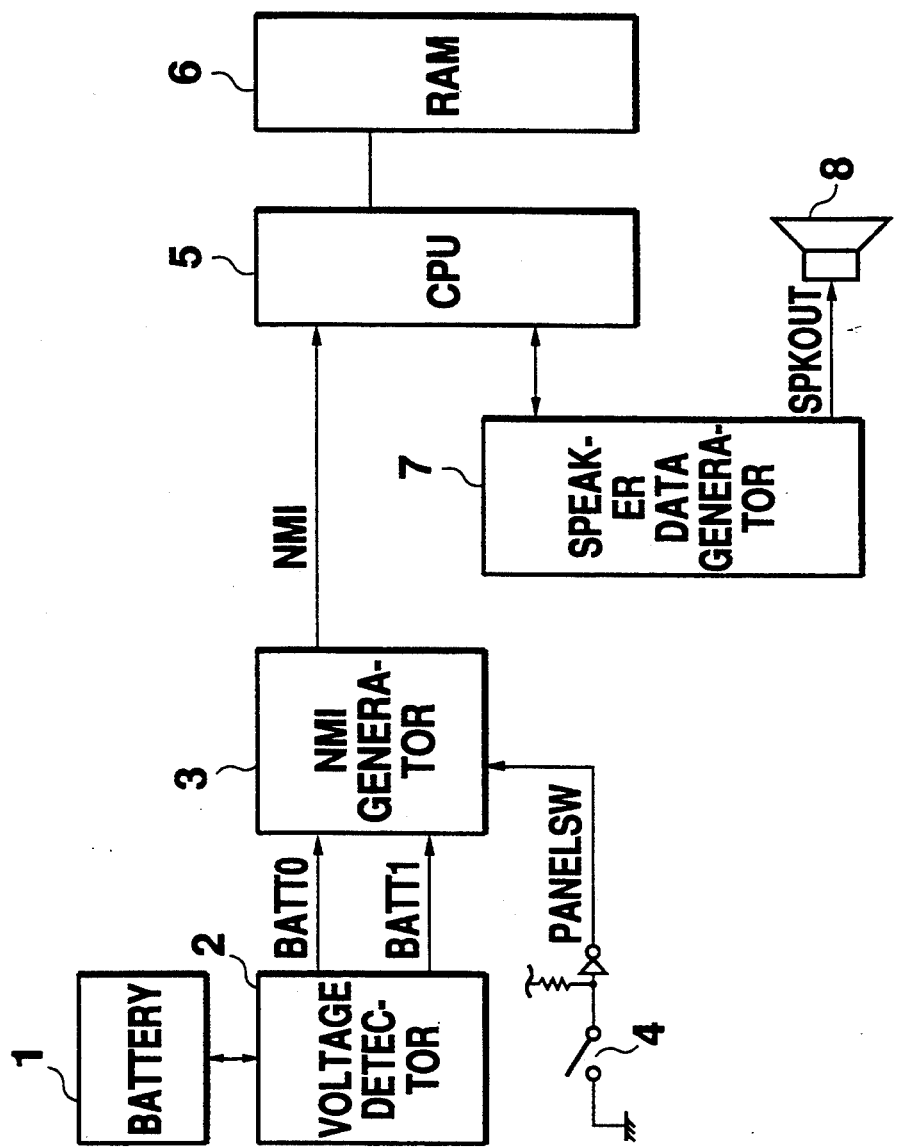
FIG. 11 is a block diagram of the structure of a conventional alarm sounding apparatus.

The state is shifted in the above-described manner on the basis of the clock signal CLK0.05 which is supplied to the buzzer clock PAL 22 so as to determine the timing for shifting the state. When the LCD panel is closed during use, an alarm is sounded for 0.05 sec once, as shown in FIG. 8. When the voltage of the nickel cadmium battery drops below the first threshold value, an alarm is sounded for 0.15 sec twice, as shown in FIG. 9. When the voltage of the nickel cadmium battery drops below the second threshold value, an alarm is sounded for 0.05 sec twice, and this cycle is repeated twice, as shown in FIG. 10.

In this embodiment, in the states S1, S3, S17 and S28, a predetermined time is elapsed (until the Carry turns to "H") in the state in which the signal CO_ST is "H". For this purpose, in this period, the signal SPKOUT supplied from the system is cut off and no alarm is sounded. A silent period (0.75 sec in this embodiment) is set before and after an alarm sounding period, thereby enabling discrimination between an alarm and the preceding sound produced in accordance with the signal SPKOUT supplied from the system. If a silent period is inserted before and after an alarm sounding period in the first embodiment, the same effect is produced as in the second embodiment.

As described above, according to the alarm sounding apparatus of the present invention, after a condition of alarm sounding is detected, the speaker is controlled through a sounding circuit which is provided exclusively for this purpose. During this period, the command for producing a sound is prohibited from being supplied from the system. Thus, an alarm sounding operation is ensured. If a silent period is provided before and after an alarm sounding period, it is easy for the user to distinguish an alarm.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A computer having a speaker for outputting one of a plurality of different alarms and a system tone, said computer comprising:

speaker data generating means for generating a sounding signal for driving said speaker to produce said system tone in accordance with data supplied from a CPU;

alarm sounding condition detecting means for detecting a plurality of different predetermined alarm sounding conditions and outputting one of a plurality of different detection signals for each of said plurality of different predetermined alarm sounding conditions; and alarm signal outputting means for receiving said one of said plurality of different predetermined alarm sounding detection signals supplied from said alarm sounding condition detecting means and said sounding signal from said speaker data generating means, and outputting said sounding signal from said speaker data generating means to produce said system tone when said one of said plurality of different detection signals is in a first state and outputting one of a plurality of alarm signals for driving said speaker to produce a corresponding one of the plurality of different alarms when said one of said plurality of different detection signals is in a second state.

2. The computer according to claim 1, wherein said alarming signal outputting means is composed of a logic circuit;

said plurality of said detection signals from said alarm sounding condition detecting means are supplied to said logic circuit; and said logic circuit selects and outputs one of said alarm signals in accordance with the states of said plurality of detection signals.

3. A computer having a CPU, a battery and a speaker for outputting one of a plurality of different alarms, comprising:

a sound signal generator that generates a a plurality of sound signals;

a low voltage battery detecting circuit that detects at least one low battery condition and outputs a separate low battery signal for each at least one low battery condition;

an open panel detecting circuit that produces an ON/OFF panel signal when a panel of the computer is open and the computer is in an on state;

at least one programmable array logic device receiving the ON/OFF panel signal and the at least one low battery signal for each at least one low battery condition, the at least one programmable array logic device outputs a plurality of alarm detection signals, each of the alarm detection signals corresponding to one of the ON/OFF panel signal and the at least one low battery signal;

a selector circuit receiving the plurality of alarm detection signals and the plurality of sound signals and outputting an alarm signal comprising one of the plurality of sound signals based on the plurality of alarm detection signals for driving the speaker to produce one of the plurality of different alarms.

4. The computer of claim 3, wherein the at least one programmable array logic device outputs a plurality of operational state signals, each of the operational state signals corresponding to one of the ON/OFF panel signal and the at least one low battery signal, and the selector circuit outputs one of the sounding signal and the detection signals on the basis of a state of each of the operational state signals.

5. The computer of claim 3, wherein the selector circuit outputs one of the plurality of sound signals and a CPU sound signal in accordance with a predetermined order of precedence when the plurality of alarm detection signals are simultaneously input to the selector circuit.

6. The computer according to claim 3, wherein the at least one programmable array logic device generates a predetermined silent period both at the start and at the end of sounding the alarm.

7. A computer speaker controller for controlling a computer speaker, comprising:

a detection circuit generating a plurality of detection signals;

a sound circuit generating a plurality of sound signals, each of the plurality of sound signals corresponding to one of the plurality of detection signals;

a speaker data generator generating a CPU sound signal to produce a system tone based on data supplied by a CPU; and a controller circuit coupled to the detection circuit, the sound circuit and the speaker data generator controlling the computer speaker, the controller circuit driving the computer speaker based on the detection signals to produce one of a plurality of sounds corresponding to each of the plurality of detection signals.

8. The computer speaker controller of claim 7, wherein the controller circuit includes:

an alarm detection signal generator, generating a plurality of alarm detection signals based on the detection signals of the detection circuit; and an alarm priority circuit selecting one of the plurality of sound signals from the sound circuit as an alarm signal and the CPU sound signal based on the alarm detection signals generated by the alarm detection signal generator.

9. The computer speaker controller of claim 7, wherein the sound circuit includes:

a tone generator generating a tone signal; and a plurality of tone pattern generators coupled to the tone generator, each tone pattern generator producing a unique time pattern of a first preset duration of the tone signal and a second preset duration of silence.

10. The computer speaker controller according to claim 7, wherein:

said detection circuit detects the voltage of a battery, outputting a first detection signal when said voltage drops below a first threshold value, and outputting a second detection signal when said voltage drops below a second threshold value; and said detection circuit further detects an ON/OFF state of a panel switch, which represents an open-/closed state of a panel, and outputs a third detection signal indicating said ON/OFF state.

11. The computer speaker controller according to claim 8, wherein said alarm signal output from said alarm priority circuit produces a predetermined silent period both at the start and at the end of a corresponding alarm.

12. The computer speaker controller according to claim 8, wherein said alarm priority circuit selects one of the plurality of sound signals and a CPU sound signal in accordance with a predetermined order of precedence when more than one of the plurality of the detection signals are simultaneously generated.

13. The computer speaker controller according to claim 8, wherein the alarm signal generator includes at least one programmable array logic device.

14. The computer speaker controller according to claim 13, wherein the at least one programmable array logic device outputs the plurality of alarm detection signals.

15. The computer speaker controller according to claim 14, wherein the alarm priority circuit comprises a selector circuit, the selector circuit receiving the plurality of alarm detection signals generated by the alarm detection signal generator and the plurality of sound signals generated by the sound circuit and outputting one of the plurality of sound signals and the CPU sound signal to the computer speaker.

* * * * *